UNITED STATES PATENT OFFICE.

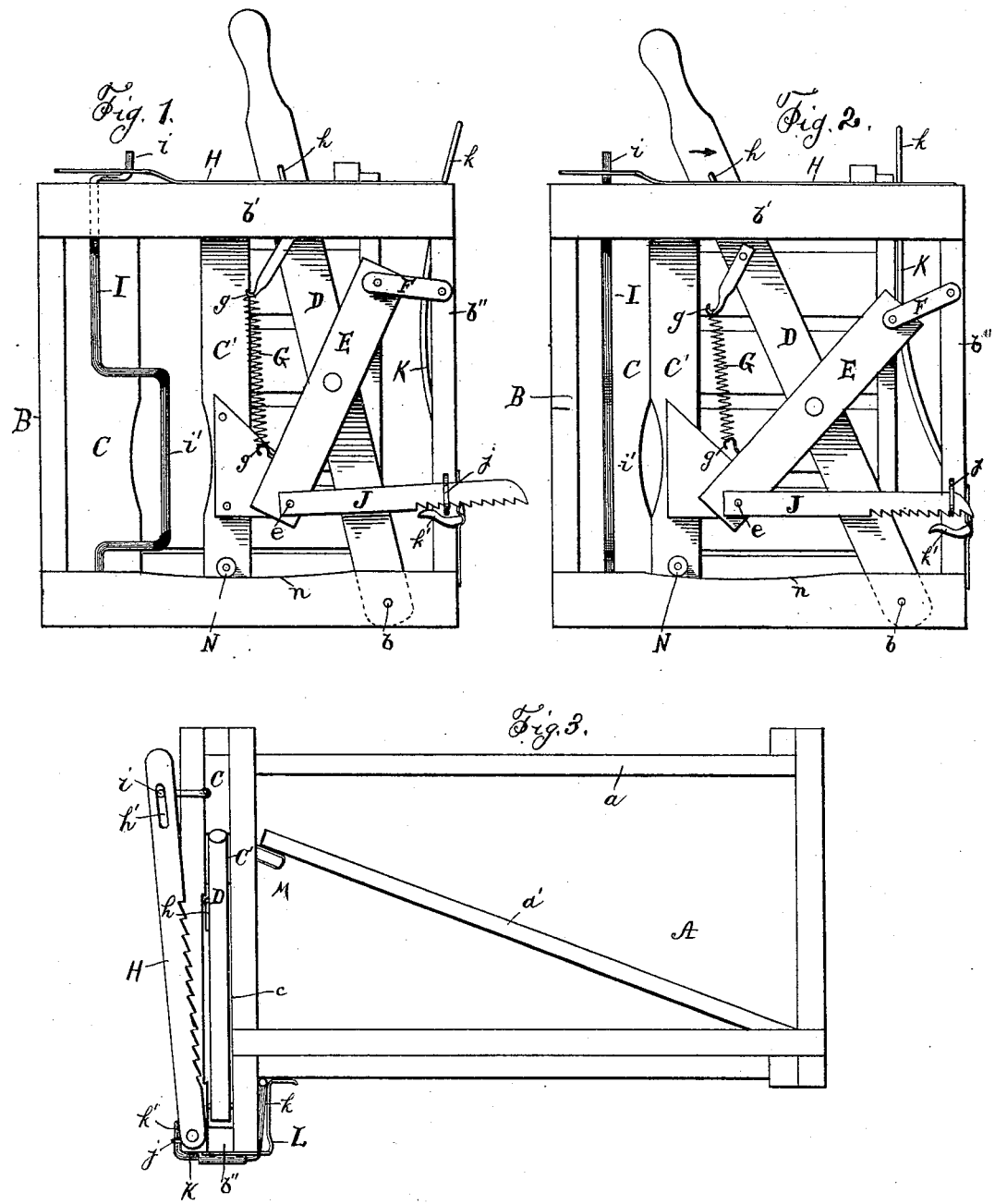

FRED BROWN, OF CARROLLTON, ILLINOIS.

HOG-TRAP.

SPECIFICATION forming part of Letters Patent No. 583,357, dated May 25, 1897.

Application filed September 22, 1896. Serial No. 606,646. (No model.)

*To all whom it may concern:*

Be it known that I, FRED BROWN, a citizen of the United States, residing at Carrollton, in the county of Greene and State of Illinois, have invented certain new and useful Improvements in Hog-Traps, of which the following is a specification.

My invention relates to that class of animal-traps which are usually employed for catching and holding hogs, although they are adapted to be used in catching other kinds of animals; and the invention has for its object to improve traps of this kind in the several particulars to be hereinafter pointed out.

In the accompanying drawings I have illustrated the preferred form of my invention; but it should be understood that I do not wish thereby to limit my invention in all its details to the particular apparatus which I have shown, as it is evident that various changes or modifications may be made without departing from the principles of the invention.

In such drawings, Figure 1 is a front or end view of the trap in its open or set position. Fig. 2 is a similar view showing the trap closed. Fig. 3 is a top plan view of the trap with the parts in the position shown in Fig. 2.

The trap proper is situated at the forward end of a passage-way A, leading from a pen or other inclosure in which the animals may be confined, and formed of a rigid panel or side $a$ and a swinging panel or side $a'$, which is hinged at its rear end.

B is a rectangular frame situated at the forward end of the passage-way A, in which are mounted the movable and operative parts of the trap. The stationary stanchion C is supported in the frame B at the forward end of the panel $a$, and the movable stanchion C' slides in slots $c$ in the frame.

D is a lever pivoted at $b$ in the lower cross-piece of the frame and extending upward through the slot $c$ in the upper cross-piece $b'$ of the frame B, its upper end being formed into a handle, so that it may be easily manipulated.

E is a lever pivoted between its ends to the lever D and connected near one end at $e$ with the sliding stanchion C' and connected at its other end by a link F with the upright $b''$ of the frame B. An examination and comparison of Figs. 1 and 2 will show that the movement of the lever D from one position to another operates to slide the stanchion C'.

G is a spring, preferably a coiled spring, arranged between the levers D and E and tending to move them in such relative positions that the stanchion C' is moved into its closed position. As shown, the levers are provided with hooks $g$, with which the spring engages. Any other arrangement of spring than that shown which accomplishes the same result might be used.

In order to lock or hold the stanchion C' in its open position and at the same time provide a trip which shall operate to release the stanchion and permit it to close under the action of the spring G whenever an animal attempts to pass through the opening between the two stanchions, I have devised the following mechanism:

H is a plate or bar, preferably of metal, pivoted on top of the cross-piece $b'$ of the frame alongside the slot $c$ and provided with a ratchet or toothed edge which is adapted to engage with a staple $h$ or other suitable projection carried by the lever D whenever the plate is swung toward the lever.

The plate or bar H is provided with a slot $h'$, in which works a crank $i$ of a vertically-disposed rod I, which is mounted alongside the stationary stanchion C. This rod has an intermediate cranked portion $i'$, which is so disposed that it may be turned to occupy a position in front of the opening between the two stanchions when they are separated or open. The two cranks $i$ and $i'$ of the rod I are so situated relative to each other that when the cranked portion $i'$ is moved in front of the opening between the stanchions the ratchet-plate H is moved into position to engage with the staple $h$ on the lever D, and so hold the movable stanchion and its operating parts in any position into which they may be moved, and when the part $i'$ is turned to one side of the opening between the stanchions, as by the passing of an animal between the stanchions, the plate H is moved to release the lever D and allow the stanchions to come together.

J is a ratchet plate or bar which is pivotally connected with the lower part of the lever E, and $j$ is a pin or staple mounted in the upright $b''$ of the frame, with which the toothed or ratcheted edge of this bar is adapted to engage. When such engagement takes place, it serves to prevent movement of the movable parts of the trap in the direction to open or separate the stanchions. This bar thus may be made to serve as a lock to hold the parts in closed position when the trap is not being used or to limit the distance to which the stanchions may be separated. K is a lever pivoted to the upright $b''$ and formed with a long arm $k$, by which it is operated, and a shorter lifting-arm $k'$, arranged below the ratchet-bar J and serving, when the lever is moved into the position shown in Fig. 1, to lift the bar J, so that it does not engage with the pin or staple $j$.

L is a spring which engages with the lever K and operates to hold it in whatever position it may be moved.

The sliding stanchion is provided on its rear side with one or more stops or bearings M, with which the front end of the swinging panel $a'$ may come in contact. These serve to prevent the outer end of this panel from swinging past the stanchion C', and also cause the panel to be moved toward the stationary panel $a$ whenever the stanchions are closed together.

N is a roller carried by the sliding stanchion near its lower end and arranged to run upon a track or way $n$ on the lower cross-piece of the frame B as the stanchion is moved back and forth.

I will now explain the operation of my trap. When it is not in use, the stanchions are brought together and locked in a closed position by the ratchet-bar J. When the trap is to be used, the lever K is thrown so as to lift the ratchet-bar J. The lever D is thrown in the direction of the arrow, Fig. 2, to open the trap the proper distance, and at the same time the rod I is turned, either automatically by a spring or by hand, so as to bring the cranked portion $i'$ opposite to the opening between the stanchions and at the same time carry the ratchet-plate H into position to hold the parts in their open position. If now an animal attempts to pass through the opening between the stanchions, it will crowd against the cranked part of the shaft I and turn the latter and release the lever D from the ratchet-plate, when the spring G will force the parts into their closed position, catching the animal. If desired, the parts of the trap may then be locked by permitting the ratchet-bar J to fall into engagement with its pin or staple, so that the animal will not be able to free itself by struggling. It will be observed that the lever D in moving to its closed position engages with the upper end of the movable stanchion and forces it before it. The stanchion being thus closed by the engagement of the lever D with its upper end and the lever E near its lower end, moves smoothly and without tendency to bind or stick in the slot $c$. It will also be observed that the trip-rod I extends in substantially the same direction (vertical) as do the stanchions and is intermediate between them, with the result that it is practically impossible for an animal to pass between the stanchions without operating the trip-rod, which result might happen were the trip-rod transverse to the stanchions. The connection between the trip-rod and the catch which operates to hold apart the stanchions is such that whenever the trip-rod is moved into the position above described the catch occupies its locking position, and whenever it is moved out of such position the catch releases the stanchions.

Having described my invention, what I claim, and desire to secure by Letters Patent, is—

1. In an animal-trap, the combination of the stanchions, means for closing them, a catch for holding them open, and a movable trip-rod extending in the same direction as the stanchions, and intermediate between them, and having connection with the catch in its locking position when disposed as set forth, whereby a movement of the trip-rod from such position operates to trip the trap, substantially as set forth.

2. The combination of the stanchions, means for closing them, a catch for holding them open, and a vertically-disposed cranked rod, I, connected with the catch, the rod being adapted to turn in its bearings, and provided with a laterally-projecting portion which is adapted to be moved in front of the opening between the stanchions, whereby the rod is turned and the catch operated whenever an animal attempts to pass between the stanchions, substantially as set forth.

3. The combination of the movable stanchion, an operating-lever, another lever pivoted thereto and connected with the stanchion, a link connecting the last-named lever with the frame, and a spring which tends to move the stanchion to its closed position, substantially as set forth.

4. The combination of the supporting-frame, the stationary stanchion C, the movable stanchion C', the operating-lever D, the lever E pivoted thereto between its ends and connected with the movable stanchion, and the link F, connecting the lever E with the supporting-frame, substantially as set forth.

5. The combination of the stanchions, one being movable, a supporting-frame, the operating-lever D, the lever E pivoted between its end to the lever D and connected with the movable stanchion, the link F connecting the lever E with the supporting-frame, and a spring connecting the levers D and E and tending to move them and the movable stanchion into their closed positions, substantially as set forth.

6. The combination of a sliding stanchion, the supporting-frame formed with slots in which the stanchion slides, an operating-lever D mounted in the said frame, another lever E pivoted to the lever D and connected with the sliding stanchion near its lower end, a link connecting the lever E with the frame, and a spring tending to move the parts into closed position, the lever D being arranged to bear against the upper end of the sliding stanchion as it approaches its closed position, substantially as and for the purpose set forth.

7. The combination of the stanchions, one of them being movable, the operating-lever, D, connections between this lever and the movable stanchion, a spring which tends to move the parts into their closed positions, a ratchet-plate H adapted to hold the parts in open position, and a rod I having a cranked upper end connected with the said ratchet-plate and arranged to occupy a position in front of the opening between the stanchions, substantially as set forth.

8. The combination of the sliding stanchion, the operating-lever D, the lever E pivoted to the lever D and connecting with the sliding stanchion, the link F connecting the lever E with the supporting-framework, the spring which tends to close the stanchion, the ratchet-bar J, and means for operating the latter, substantially as set forth.

9. In an animal-trap, the passage-way A comprising a swinging panel $a'$, in combination with a sliding stanchion arranged at the forward end of the passage-way, means for closing the stanchion, and bearings M carried by the sliding stanchion adapted to engage with the forward end of the swinging panel when the stanchion is being closed, substantially as set forth.

FRED BROWN.

Witnesses:
E. W. CHISM,
H. C. KENNEY.